United States Patent [19]

Miyata et al.

[11] Patent Number: 5,172,327

[45] Date of Patent: Dec. 15, 1992

[54] AUTOMATIC PROGRAMMING METHOD

[75] Inventors: Mitsuto Miyata; Teruyuki Matsumura, both of Tokyo; Takahiko Mineshige, Yamanashi, all of Japan

[73] Assignee: Fanuc Ltd., Yamanashi, Japan

[21] Appl. No.: 415,305

[22] PCT Filed: Jan. 11, 1989

[86] PCT No.: PCT/JP89/00025

§ 371 Date: Sep. 7, 1989

§ 102(e) Date: Sep. 7, 1989

[87] PCT Pub. No.: WO89/06391

PCT Pub. Date: Jul. 13, 1989

[30] Foreign Application Priority Data

Jan. 11, 1988 [JP] Japan .................. 63-003558

[51] Int. Cl.⁵ .................. G06F 15/46; G05B 19/18
[52] U.S. Cl. .................. 364/474.21; 364/191; 364/474.02; 364/474.26; 364/474.27
[58] Field of Search .............. 364/191, 474.22, 474.21, 364/474.33, 474.32, 474.25, 474.26, 474.02, 474.14, 474.21, 474.27

[56] References Cited

U.S. PATENT DOCUMENTS

| | | | |
|---|---|---|---|
| 3,685,022 | 8/1972 | Raynes | 364/474.21 |
| 4,587,608 | 5/1986 | Kishi et al. | 364/191 |
| 4,723,203 | 2/1988 | Kishi et al. | 364/191 |
| 4,855,898 | 8/1989 | Kawamura et al. | 364/191 |
| 4,922,440 | 5/1990 | Kawamura et al. | 364/474.22 |
| 4,992,948 | 2/1991 | Pilland et al. | 364/474.22 |
| 5,043,645 | 8/1991 | Miyata et al. | 364/474.22 |

FOREIGN PATENT DOCUMENTS 0090439 5/1983 Japan .................. 364/474.22

*Primary Examiner*—Joseph Ruggiero
*Attorney, Agent, or Firm*—Staas & Halsey

[57] ABSTRACT

There are provided a first machining method in which a tool (TL) is fed a predetermined amount (d) in a center direction of a blank to cut into the blank, after which the tool is fed in a cutting mode by an amount (W) corresponding to groove width longitudinally of the blank to perform grooving, and a second machining method in which the tool (TL) is fed in the center direction of the blank to perform machining down to the groove bottom (GB), after which the tool is raised to perform grooving. Based on data indicative of the shape of the tool used, it is decided whether to perform grooving down to the designated groove bottom (GB) by repeating the first machining method or perform grooving to a designated groove width by repeating the second machining method.

2 Claims, 10 Drawing Sheets

FIG. 3

* BLANK AND PART *

FIGURE ELEMENT --- [ ↑ — G ]  — PFS

[diagram showing X and Z axes with G, dt, wt labels] — PFG

ES = _

| ABORT | | | | | | | | | NEXT PAGE |

FIG. 4

* MACHINING DEFINITION *   TYPE OF MACHINING

PROCESS 01  OUTER DIAMETER ROUGH CUTTING

PROCESS 07  GROOVING OR CORNERING

TYPE OF MACHINING --- PROCESS 07 =

1. CENTER BORING
2. DRILLING
3. OUTER DIAMETER ROUGH CUTTING
4. INNER DIAMETER ROUGH CUTTING
5. OUTER DIAMETER INTERMEDIATE FINISHING
6. INNER DIAMETER INTERMEDIATE FINISHING
7. OUTER DIAMETER FINISHING
8. INNER DIAMETER FINISHING
9. GROOVING OR CORNERING
10. THREADING

| ABORT | | | | | | | | | NEXT PAGE |

FIG. 6

```
*** MACHINING DEFINITION ***   CUTTING CONDITIONS
   PROCESS 07 GROOVING OR CORNERING

CUTTING CONDITIONS
       PECKING YES/NO  ----   PE = 0
         (YES =1, NO =0)
       DEPTH OF CUT -------   D = d
       RELIEF         ------  U = u
       CLEARANCE      ------  C = c
       FINISHING      ------  TW = m
         TOLERANCE            TB = n

[ABORT]                          [NEXT PAGE]
```

FIG. 7

```
*** MACHINING DEFINITION ***   CUTTING AREA
                                DEFINITION
   PROCESS 07 GROOVING OR CORNERING

Pe       Ps    ↑X
               ___  _____
              |   |_|           |
              |                 |
              |_____|
              Z ←

CUTTING AREA DEFINITION
      STARTING ( . )  END POINT ( . )
      POINT

[ABORT]                          [NEXT PAGE]
```

TOOL DATA : NO = 1

NOSE RADIUS ---- RN =
CUTTER ANGLE --- AC = -90
NOSE ANGLE ----- AN = 90
IMAGINERY NOSE --- XN =
POSITION          ZN =

NOSE WIDTH ------ WN =
MOUNTING ANGLE ---- AS =
MOUNTING POSITION --- XS =
                     ZS =

TOOL DATA : NO = 2

NOSE RADIUS ---- RN =
CUTTER ANGLE --- AC = 90
NOSE ANGLE ---- AN = -90
IMAGINERY NOSE -- XN =
POSITION         ZN =

NOSE WIDTH ----- WN =
MOUNTING ANGLE --- AS =
MOUNTING POSITION-- XS =
                    ZS =

AUTOMATIC PROGRAMMING METHOD

TECHNICAL FIELD

This invention relates to an automatic programming method and, more particularly, to an automatic programming method which creates an NC program for machining a part having a groove shape that is wide and deep.

BACKGROUND ART

An automatic programming system is available in which a dialog display and a function key (soft key) display are each presented in accordance with each step of a plurality of data input step. In such a method a function key (soft key) conforming to a specific function and appearing on the function key display is pressed to thereby execute processing corresponding to the function, and an NC program for turning is prepared using data inputted while referring to the dialog display.

An automatic programming system of this kind, which will be described with reference to FIG. 12, successively displays predetermined message images (the dialog display) on a display screen in accordance with the following steps:

(1) a first step of selecting execution of "AUTOMATIC PROGRAMMING";

(2) a second step of selecting data to be inputted (a step to be executed next);

(3) a third step of selecting the material of a blank;

(4) a fourth step of setting surface roughness;

(5) a fifth step of selecting a drawing format;

(6) a sixth step of inputting the blank profile and the dimensions thereof;

(7) a seventh step of inputting a part profile and the dimensions thereof;

(8) an eighth step of inputting the machining reference point and turret position;

(9) a ninth step of selecting a machining process;

(10) a tenth step of selecting a tool and inputting tool data;

(11) an eleventh step of deciding machining conditions;

(12) a twelfth step of inputting cutting direction;

(13) a thirteenth step of inputting cutting limits;

(14) a fourteenth step of inputting whether or not an area is to be cut by the same tool; and

(15) a fifteenth step of computing a tool path (i.e. of preparing NC data).

An operator responds to the messages by entering the necessary data from a keyboard. Finally, an NC program (NC data) for turning is created using all of the entered data.

Accordingly, when a slot shape is entered at the part profile input step (seventh step) and data for machining the slot are entered at the machining processing input step (ninth step), an NC program of a tool path $(P_s \rightarrow P_1 \rightarrow P_e)$ for machining a slot SLT from a starting point $P_s$ to an end point $P_e$ shown in FIG. 13(a), by way of example, is created at the 15th step of computing a tool path (NC program creation).

There are cases where a slot SLT having a great width as shown in FIG. 13(b) is machined. In such cases, the conventional automatic programming method is such that, after cutting is performed over a cutting depth d from the starting point $P_s$ to the point $P_1$, the tool TL is raised to the point $P_s$ in rapid-traverse, the tool is then fed longitudinally of the blank by an amount w corresponding to tool width and the same machining is performed from a point $P_2$, after which the foregoing is repeated up to the end point $P_e$. Thus, a tool path is decided in such a manner that the foregoing grooving will take place. When machining is thus performed down to the deepest part of a slot by the tool width according to the conventional method, the tool TL is raised to the outside of the slot SLT and is shifted by the amount of the tool width, after which a neighboring portion is machined.

Consequently, when the slot SLT to be machined has a large width and depth, a long period of time is needed for cutting and the actions for raising the tool out of the slot increase in number, as a result of which machining time increases correspondingly.

SUMMARY OF THE INVENTION

Accordingly, an object of the present invention is to provide an automatic programming method through which a tool path can be decided that will shorten grooving time.

An automatic programming method according to the present invention is characterized by providing a first machining method in which a tool is fed a predetermined amount in a center direction of a blank to cut into the blank, after which the tool is fed an amount corresponding to groove width longitudinally of the blank to perform grooving. The present invention also provides a second machining method in which the tool is fed in the center direction of the blank to perform machining down to a groove depth. After this the tool is raised to perform grooving. The type of groove is determined based on tool data for the tool used in grooving. Either grooving down to a designated groove depth by repeating the first machining method or grooving to a designated groove width by repeating the second machining method is performed. Then a grooving tool path based on the machining method decided, and NC data for moving the tool along the tool path are created.

BRIEF DESCRIPTION OF THE DRAWINGS

FIG. 3 is a dialog screen for inputting a part profile;

FIG. 4 is a dialog screen for selecting a machining process;

FIG. 6 is a dialog screen for inputting cutting conditions;

FIG. 7 is a dialog screen for inputting a cutting area;

DESCRIPTION OF THE PREFERRED EMBODIMENT

Figure 1:
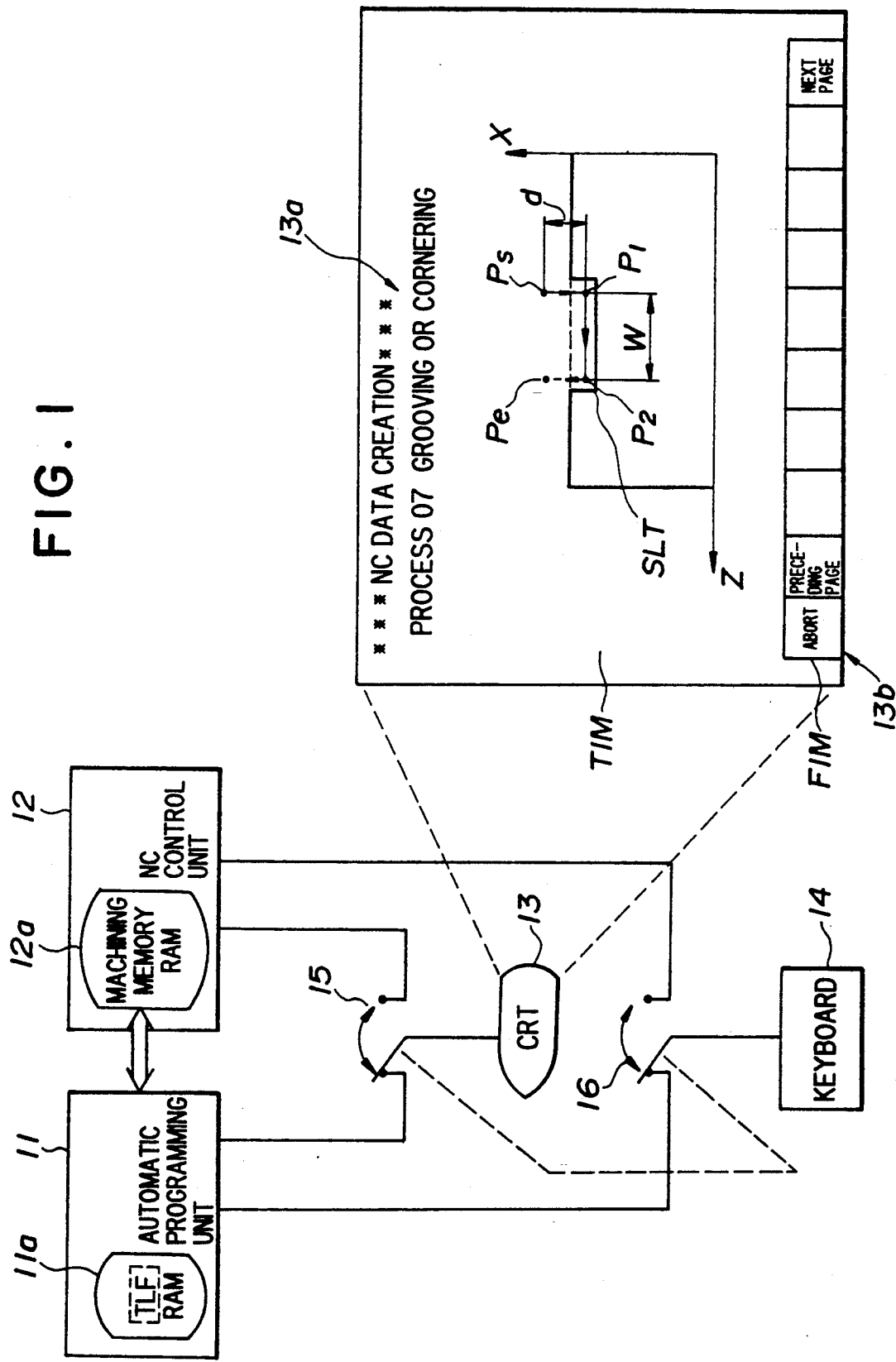
FIG. 1 is a block diagram of an NC apparatus having an automatic programming function for realizing the method of the present invention.

FIG. 1 is a block diagram of an NC apparatus having an automatic programming function for realizing the method of the present invention.

Numeral 11 denotes an automatic programming unit, 12 an NC control unit, 13 a graphic display unit (CRT) 14 a keyboard, and 15, 16 changeover units. The changeover units 15, 16 are illustrated as being switches for the sake of the description. In actuality, however, changeover is effected by software processing.

The automatic programming unit 11 and NC control unit 12 are of microcomputer construction and incorporate an internal processor, a control program memory (ROM) and a RAM.

Figure 2:
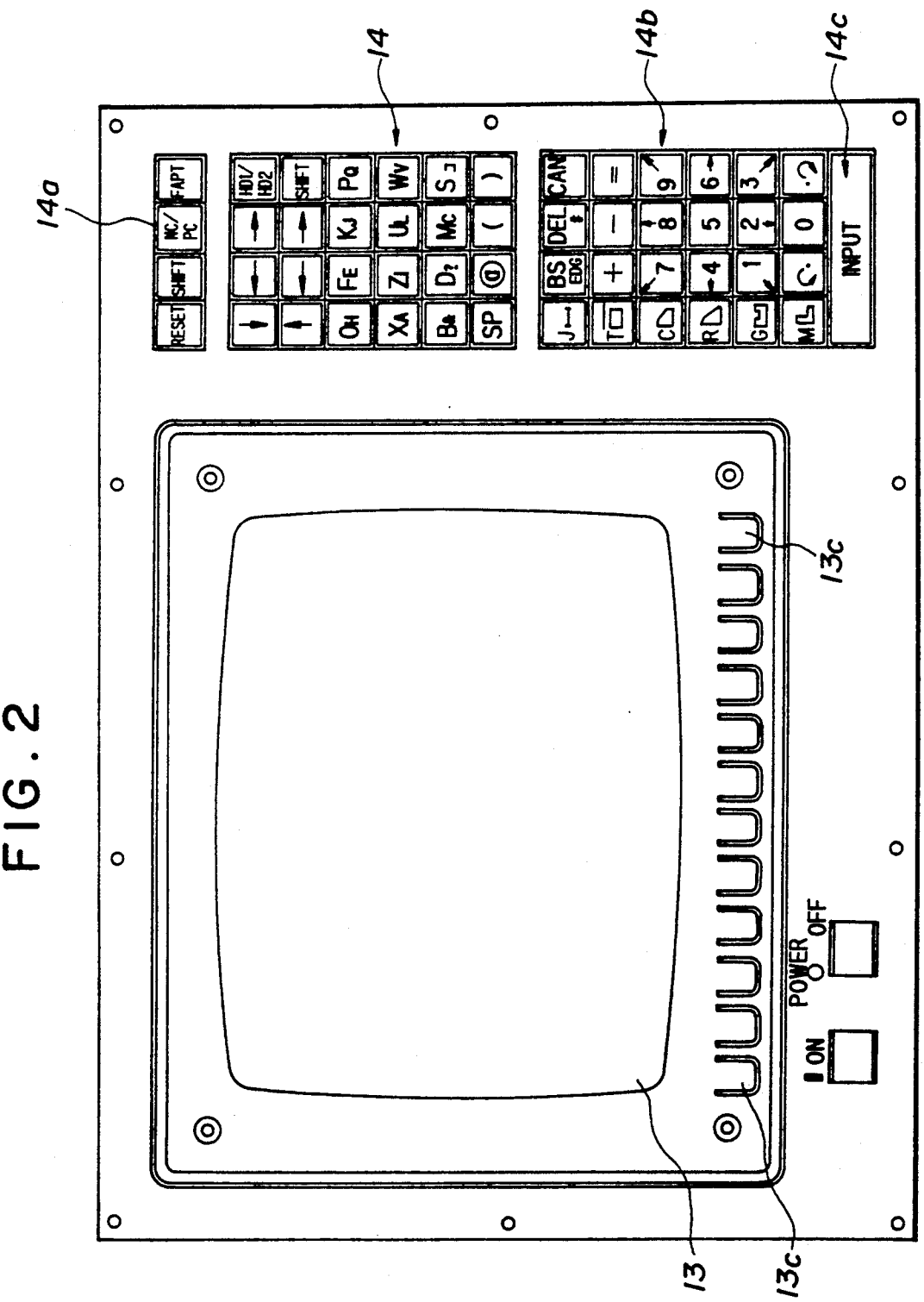
FIG. 2 is an external view of a CRT/MDI unit in the NC apparatus.
Figure 5:
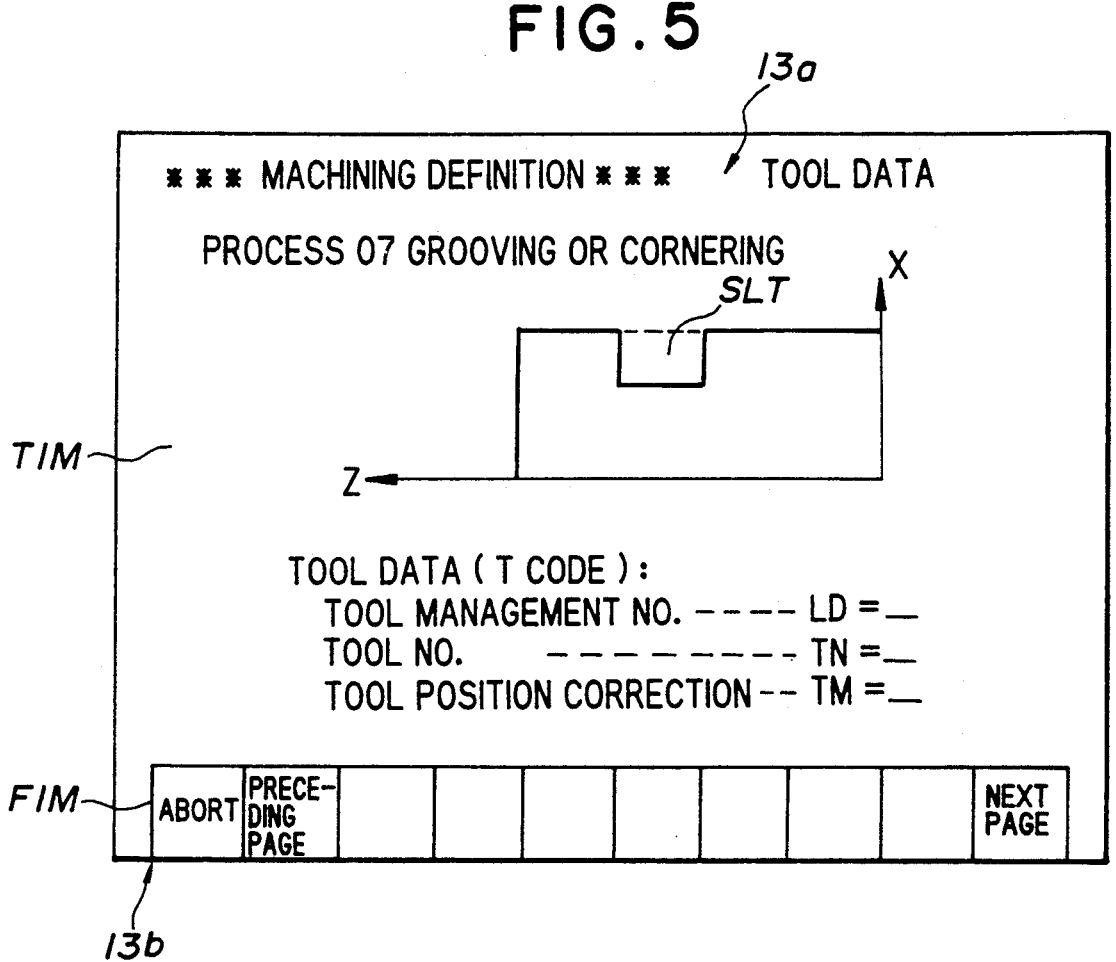
FIG. 5 is a dialog screen for selecting a tool.

The graphic display unit 13 and keyboard 14 are integrated into a single unit, as shown in FIG. 2, which is usually referred to as a CRT/MDI unit. As shown in FIG. 1, the display screen is divided into a dialog display area 13a and a soft key area 13b. Keys 13c, 13c (see FIG. 2) are provided to correspond to the soft key area. Pressing one of the keys enables the corresponding function displayed in the soft key area to be inputted. The keyboard 14 has an NC mode/automatic programming mode selection key 14a and a key group 14b, which includes keys serving as both arrow and numeric keys, as well as a C key and R key. Numeral 14c denotes an input key.

Automatic programming processing of the invention will now be described in accordance with the dialog screens of FIGS. 3 through 7.

Figure 8A:
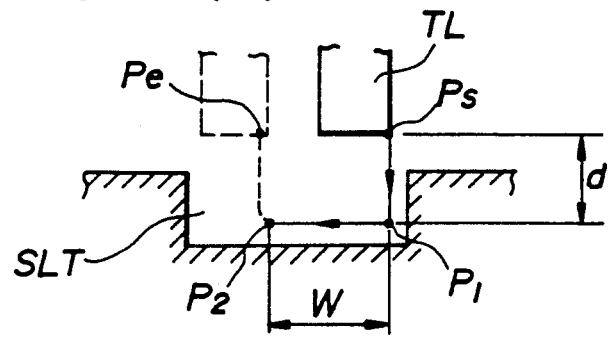
FIGS. 8(a)-8(c) shows an example of a tool path according to the present invention.
Figure 8B:
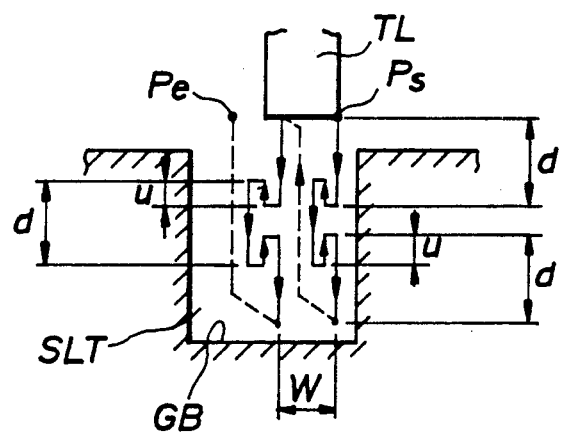

As shown in FIGS. 8(a) and (c), there is a first machining method in which a tool TL is fed a predetermined amount d in a center direction of a blank to cut into the blank, after which the tool is fed an amount W corresponding to groove width longitudinally of the blank to perform grooving. A second machining method is shown in FIG. 8(b). In the second method the tool TL is fed in predetermined increments of the distance d in the center direction of the blank to perform machining down to groove depth, after which the tool is raised to perform grooving. Based on tool data for the tool used, it is decided automatically which of these machining methods is to be performed.

Figure 9:
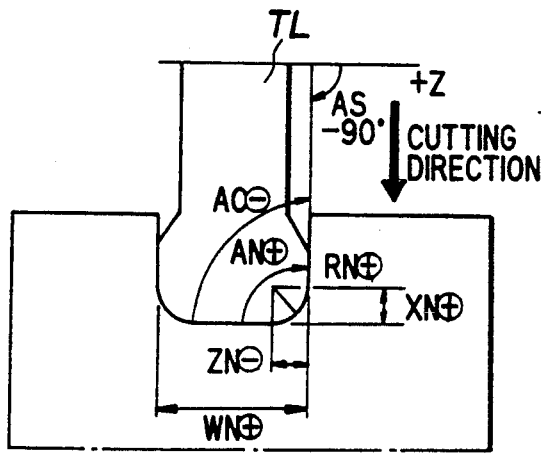
FIGS. 9(a)-9(b) are views for describing tool data.
Figure 9:
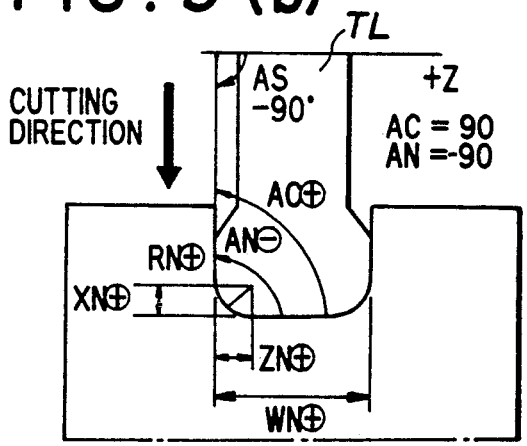

More specifically, the tool used in grooving has the shape shown in FIGS. 9(a) and 9(b). With regard to the tool which performs grooving by repeating the first machining method, the cutter angle AC and nose angle AN are both set to zero in the tool data. As for the tool which performs grooving by repeating the second machining method, the cutter angle AC and nose angle AN are both set to values other than zero (non-zero values). When the grooving tool has been decided, a check is made to see whether the cutter angle AC and nose angle AN of the tool are both zero. When $AC=0$, $AN=0$ holds, the tool path is decided based on the first machining method. When $AC\neq 0$, $AN\neq 0$ hold, the tool path is decided based on the second machining method.

A tooling file TLF is created in which tool number and tool shape data (cutter angle and nose angle) are made to correspond to a tool management number, and the tooling file TLF is registered in a RAM 11a of the automatic programming unit 11 as shown in FIG. 1.

The operator operates the key 14a (FIG. 2) on the keyboard 14 to cause the changeover units 15, 16 to devote the graphic display unit 13 and keyboard 14 to the automatic programming unit 11. Thereafter, in accordance with the programming function of the automatic programming unit 11, processing up to the sixth step is executed in dialog fashion in a manner similar to the flow of the conventional method shown in FIG. 12. If a soft key "NEXT PAGE" is pressed in the sixth step, a part profile input processing routine is started to display the part profile input screen and make possible a part profile input (see FIG. 3). In response to a prompt (ES=) regarding a part profile element displayed on the display screen, a part profile which contains a groove shape is entered by operating the arrow keys ( ↑, →, ↓, ←,etc.) and groove key (G key) provided on the keyboard. Whenever one part profile element is entered using an arrow key, a prompt regarding the dimensions of the element is displayed. Therefore, when dimensions taken from a design drawing are entered in response to the prompt, a symbol PFS of the figure element and a graphic image PFG of the figure element of the figure element are displayed on the display screen. In this example, a groove width dimension wt and a groove depth dimension dt are entered in response to dimension prompts after the grooving key (G key) is pressed.

Figure 12:
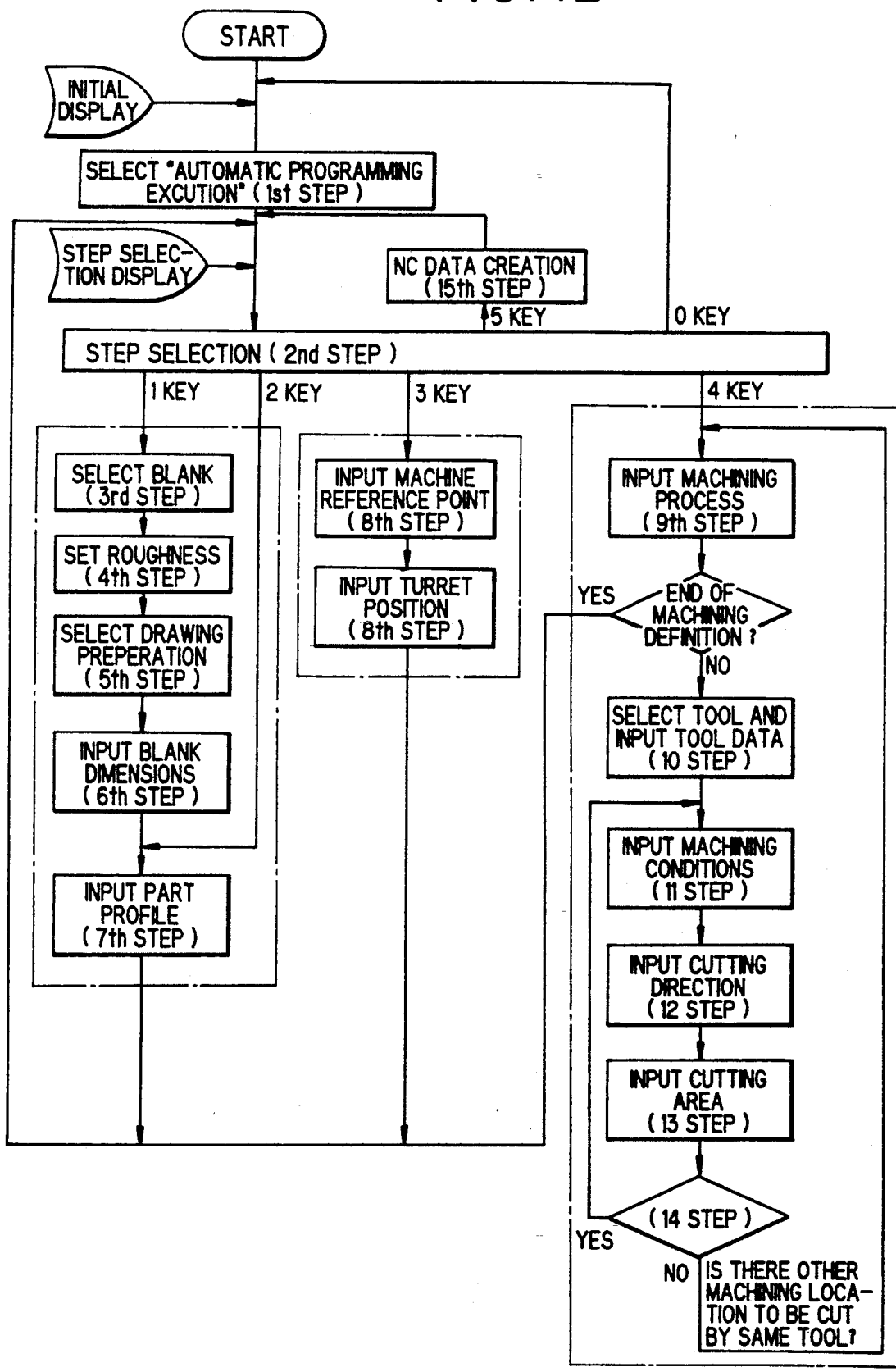
FIGS. 12, 13a and 13b are views for describing an example of the prior art.
Figure 13:
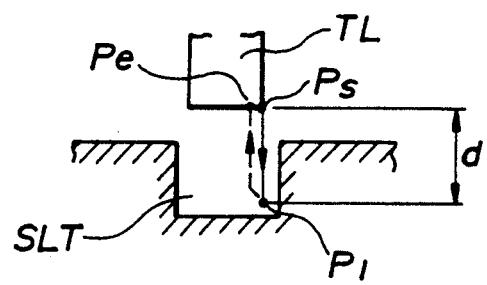
Figure 13:
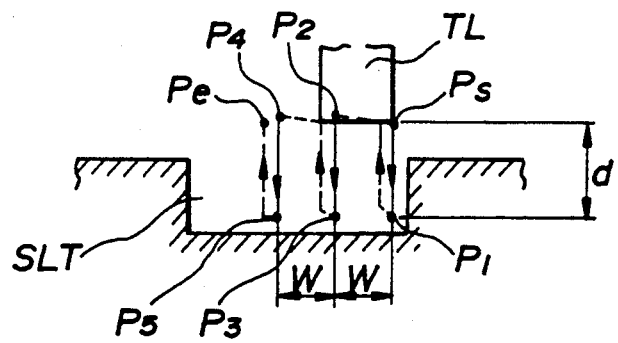

Thereafter, an operation similar to that of the prior art is performed in accordance with the flowchart of FIG. 12. Then, when the process "9. GROOVING OR CORNERING" is selected by a prescribed operation from the dialog screen shown in FIG. 4 in the machining definition of the ninth, step (FIG. 12), a tool selection screen (FIG. 5) is displayed to make input of tool number possible (the tenth step in the flowchart of FIG. 12). Here the operator decides the tool upon taking into consideration the shape of the groove to be machined, and enters the tool management number of this tool. In other words, the operator decides the tool upon considering whether grooving is performed by repeating the first machining method [FIGS. 8(a), (c)] or the second machining method [FIG. 8(b)], and then enters the tool management number. Thus, as discussed with respect to FIGS. 9(a) and 9(b), if the first machining method is desired, the operator sets the tool data for the cutter angle AC and the nose angle AN to zero; and for the second machining method the operator sets the tool data so that AC and AN one non-zero. It should be noted that an arrangement can be adopted in which the tool for grooving can be decided automatically from the tooling file registered beforehand in the RAM of the automatic programming unit 11.

Figure 10:
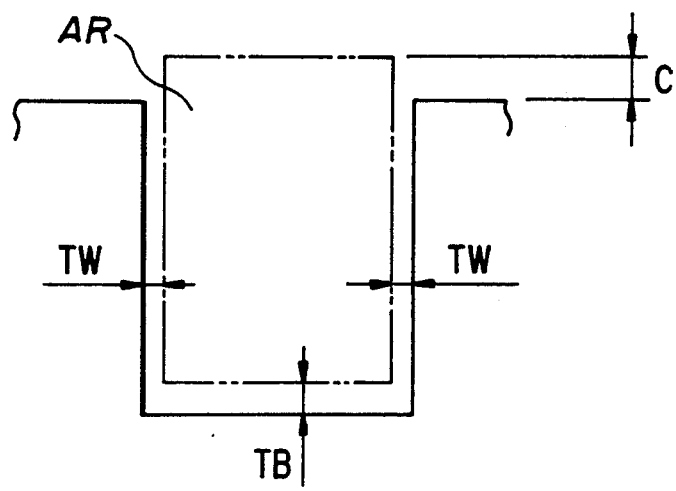
FIG. 10 is a view for describing cutting condition data.

When entry of the tool management number or automatic decision processing end and the soft key "NEXT PAGE" is pressed, the automatic programming unit 11 reads the tool shape data of this tool management number out of the tooling file TFL and displays it on the CRT 13. Thereafter, when the soft key "NEXT PAGE" is pressed again, the automatic programming unit 11 displays the cutting condition input screen (FIG. 6) on the CRT, whereby entry of the cutting condition data for grooving becomes possible (11th step in the flowchart of FIG. 12). Pecking yes/no (PE=) on the cutting condition input screen refers to a machining method in which cutting is performed over a number of cycles while the tool is raised a relief amount u, this being carried out in a case where cutting cannot be performed down to the deepest part of a groove with a single depth of cut d, as in the case of a deep slot SLT shown in FIG. 8(b). In addition, clearance (C=) and finishing tolerances (TW=, TB=) are entered in order to specify a rough machining area AR (an area enclosed by the two-dot chain line), as shown in FIG. 10.

When the operator enters cutting conditions MS on the cutting condition input screen, as shown in FIG. 6, and then enters predetermined cutting direction data on a dialog screen for entering cutting direction, the automatic programming unit 11 displays a dialog screen (FIG. 7) for cutting area input on the CRT 13, whereby it becomes possible to enter starting and end points of the cutting area (13th step of the flowchart of FIG. 12). Here the operator enters the coordinates of the starting point $P_s$ and end point $P_e$ of the groove shape.

Figure 11:
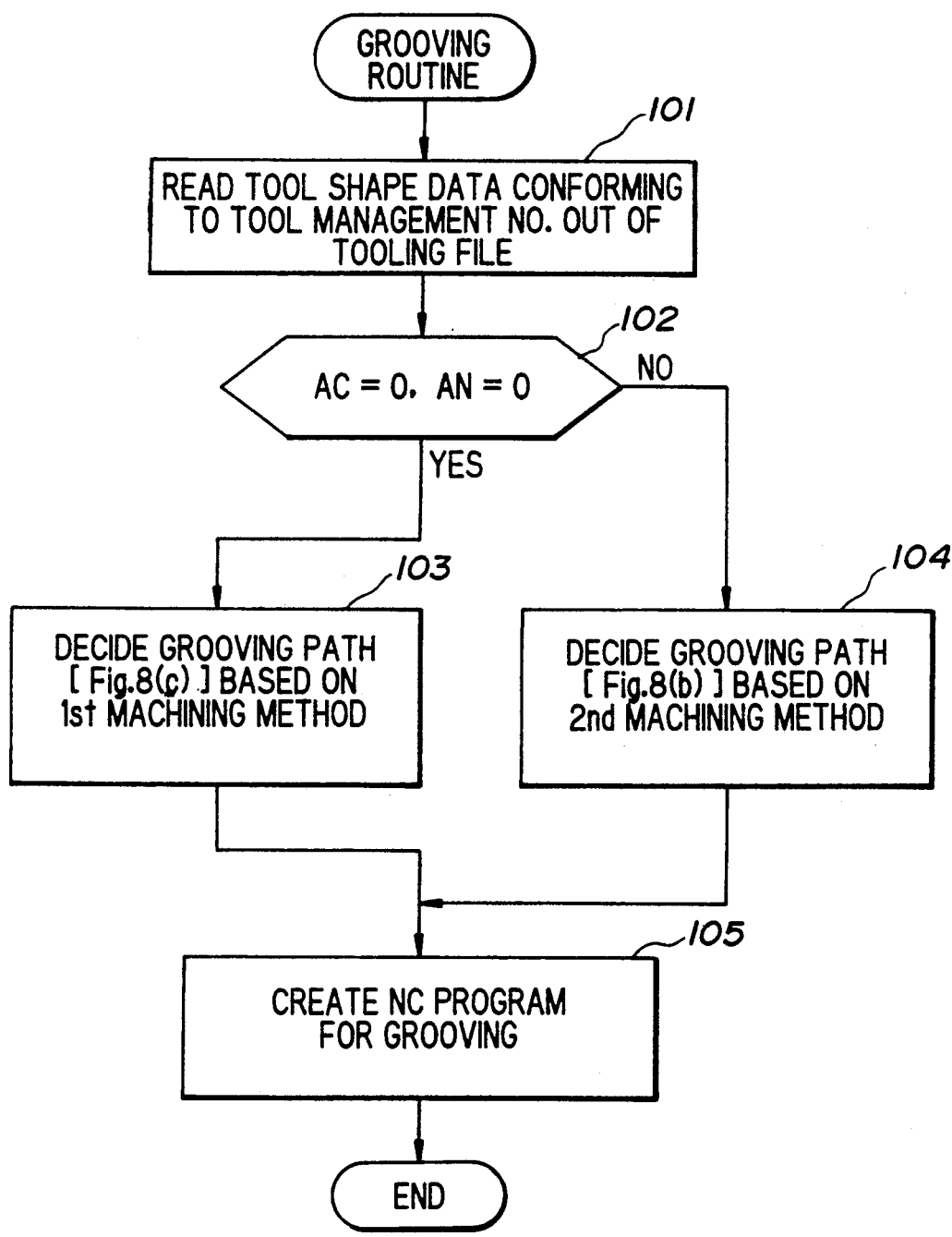
FIG. 11 is a flowchart of processing according to the invention.

Thereafter, when the execute key is pressed after all data necessary for creation of the NC machining program have been entered, the automatic programming unit 11 decides a tool path for each entered machining process. The tool path for grooving is decided in a manner which will now be described with reference to the flowchart of FIG. 11.

The automatic programming unit 11 goes to the tooling file TLF to read out the tool shape data of the grooving tool corresponding to the tool management number entered or automatically decided (step 101), and checks to see whether the cutter angle AC and nose angle AN contained in the tool data are both zero (step 102).

If AC=0, AN=0 holds, then a tool path will be created along which grooving is performed repeatedly down to a designated groove depth on the basis of the first machining method (step 103). However, if AC≠0, AN≠0 hold, a tool path will be created along which grooving is performed repeatedly to a designated groove width on the basis of the second machining method (step 104).

Figure 8C:
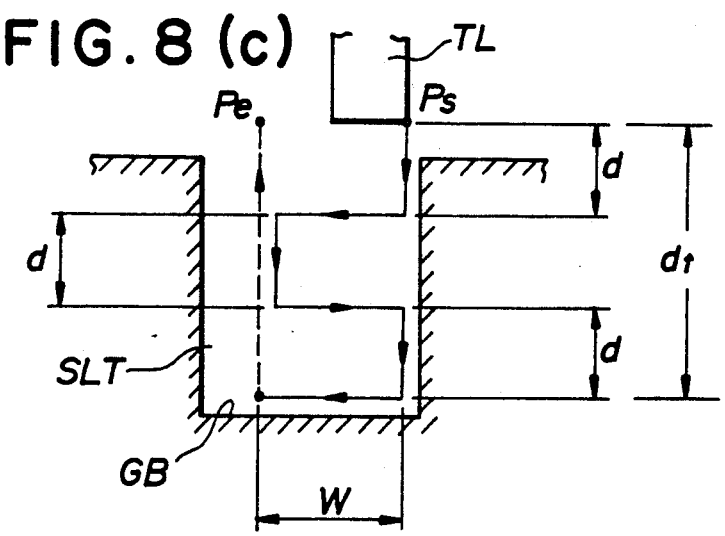

By way of example, if AC=0, AN=0 hold, the tool path is one in which the tool is fed a predetermined amount d in the direction of the center of the blank from the starting point $P_s$ [see FIG. 8(a)] to cut into the blank, after which grooving is carried out be feeding the tool in the longitudinal direction of the blank by the amount W corresponding to groove width. If machining cannot be performed to the depth dimension dt of the groove by the single predetermined feed amount d, the operation is split into a number of parts, as shown in FIG. 8(c), to feed the tool to the deepest portion of the groove to execute grooving.

On the other hand, if AC≠0, AN≠0 hold, the tool path is one in which cut-in of the predetermined amount d from starting point $P_s$ [FIG. 8(b)] to groove bottom GB and withdrawal by the relief amount u are repeated. The tool is raised temporarily after the groove bottom GB is reached and subsequently shifted in the groove width direction by the amount W corresponding to the tool width. The foregoing operation is repeated until machining over the entire groove width ends.

When the tool path has been decided by virtue of the above, the automatic programming unit 11 creates an NC program that will move the tool along the tool path to perform grooving, and causes the tool path to be displayed on the CRT screen, after which the automatic programming processing is terminated (step 105).

In the foregoing, the description is based on the assumption that the tooling file has been registered. However, in a case where no tooling file exists, it will be necessary to enter the tool shape data one item at a time. In such case, grooving will be carried out in accordance with the first machining method [FIGS. 8(a), (c)] if the cutter angle AC and tool nose angle AN in the entered tool shape data are such that AC=AN =0 holds.

Further, in the foregoing description, it is decided to perform grooving in accordance with the first machining method or the second machining method depending upon whether the cutter angle AC and nose angle AN are both zero. However, an arrangement can be adopted in which other tool shape data are made zero or non-zero depending upon the machining method, or in which data indicating that grooving is to be carried out in accordance with the first or second machining method are separately provided and incorporated in the tool data.

Thus, in accordance with the present invention, there are provided a first machining method in which a tool is fed a predetermined amount in a center direction of a blank to cut into the blank, after which the tool is fed an amount corresponding to groove width longitudinally of the blank to perform grooving, and a second machining method in which the tool is fed in the center direction of the blank to perform machining down to groove depth, after which the tool is raised to perform grooving, and the arrangement is such that a grooving tool path is created based on the machining method, which is selected in dependence upon the tool data indicative of the grooving tool. Thus, by selecting a tool conforming to the first or second machining method, it is possible to automatically decide a tool path capable of shortening grooving time. The invention is particularly effective when grooves are wide and deep.

We claim:

1. An automatic programming method for creating an NC program for machining a blank, comprising the steps of:
   storing a plurality of machining methods;
   storing tool data identifying a tool to be used and including identification data which specifies one of said plurality of machining methods;
   selecting a tool to be used;
   selecting one of said machining methods based on said identification data;
   creating data defining a tool path based on said selected machining method;
   storing said tooling data as a collection of tool data for a number of tools in a tooling file including identification data; and
   in a case where grooving is performed by a predetermined grooving tool by repeating a first one of the machining methods, cutter angle AC and nose angle AN contained in tool shape data of said tool are both set to zero; and
   in a case where grooving is performed by a predetermined grooving tool by repeating a second one of the machining methods, cutter angle AC and nose angle AN contained in tool shape data of said tool are both set to non-zero, with the cutter angle and nose angle serving as said identification data.

2. An automatic programming method according to claim 1, further comprising the steps of:
   when the cutter angle AC and nose angle AN of the tool used are both zero, a tool path is created along which grooving is performed repeatedly down to groove depth based on the first machining method; and
   when AC≠0, AN≠0, a tool path is created along which grooving is performed repeatedly over designated groove width based on the second machining method.

* * * * *